(12) United States Patent
Sever (10) Patent No.: US 8,025,468 B2
(45) Date of Patent: Sep. 27, 2011

(54) METAL COIL SECURING APPARATUS AND METHOD

(76) Inventor: Paul Sever, Cranberry Township, PA (US)

(*) Notice: Subject to any disclaimer, the term of this patent is extended or adjusted under 35 U.S.C. 154(b) by 518 days.

(21) Appl. No.: 12/060,451

(22) Filed: Apr. 1, 2008

(65) Prior Publication Data

US 2009/0245964 A1 Oct. 1, 2009

(51) Int. Cl.
*B60P 7/08* (2006.01)

(52) U.S. Cl. .............. 410/47; 410/50; 410/98; 410/100; 410/97; 410/118

(58) Field of Classification Search .................. 410/34, 410/36, 42, 47, 48–50, 96, 97, 100, 118, 410/155, 98; 150/154; 296/100.15, 100.16; 248/499; 24/300–302
See application file for complete search history.

(56) References Cited

U.S. PATENT DOCUMENTS

| | | | |
|---|---|---|---|
| 2,212,180 A | 8/1940 | Murphy | |
| 3,154,026 A | 10/1964 | Klasing, Jr. | |
| 3,541,977 A | 11/1970 | Waldman | |
| 4,008,669 A | 2/1977 | Sumrell | |
| 4,204,479 A | 5/1980 | Rosa | |
| 4,786,223 A | 11/1988 | Crissy et al. | |
| 4,876,841 A * | 10/1989 | Jensen | |
| 5,888,039 A | 3/1999 | Cooley | |
| D494,919 S | 8/2004 | Davis et al. | |
| 7,214,014 B2 | 5/2007 | Stanley | |
| 7,270,507 B1 | 9/2007 | Jernigan | |
| 7,726,710 B2 * | 6/2010 | Handwerker | |
| 2005/0249568 A1 * | 11/2005 | Gormly et al. | 410/97 |

* cited by examiner

*Primary Examiner* — Stephen Gordon
(74) *Attorney, Agent, or Firm* — The Webb Law Firm (57) ABSTRACT

A metal coil securing device is disclosed including a coil cover adapted to encompass a metal coil and a plurality of tie down straps affixed to the coil cover, with each tie down secured along a portion of its length to the coil cover such that each tie down has two free ends extending outward from the periphery of the coil cover. In one embodiment, the tie down straps are secured to a circular coil cover to intersect at an approximate center of the coil cover and extend radially outward therefrom. A method of securing a metal coil to a transport trailer is also disclosed generally including associating and securing the coil cover with the metal coil, loading the metal coil with the secured coil cover onto the transport trailer, and using the free ends of the tie down straps to secure the metal coil to the transport trailer.

16 Claims, 5 Drawing Sheets

METAL COIL SECURING APPARATUS AND METHOD

BACKGROUND OF THE INVENTION

1. Field of the Invention

An objective of the invention described herein relates to providing a device and method of securing metal coils to a flatbed trailer and desirably from ground level thereby obviating the need for anyone to be on the trailer itself at any time during the securing process.

2. Description of Related Art

In the standard practice of securing metal coils to flatbed transport trailers, truck drivers and other persons often have to climb onto the flatbed to accomplish securing and tarping operations. This raises the possibility of injury as the truck driver and others may fall of the flatbed portion of the transport trailer and sustain injury and, in extreme circumstances, even death. Shippers have recognized the risk and safety concerns and in some cases have installed fall protection devices on the flatbed portion of the transport trailer often at an enormous expense. Some of known fall protection systems include mechanical devices that close in on the flatbed and have railings, fall prevention harnesses for the truck drivers so they can be hooked to a cable attached above the flatbed, and permanent flatbed extensions to allow for more footroom on the flatbed for the truck drive. While these device are improvements and in part address fall prevention issues, they tend to be expensive solutions and cumbersome for the user. More typically, fall prevention issues go completely unaddressed and simple mechanical load tie-down devices are found in the shipping art. Some these conventional mechanical devices are discussed immediately hereinafter.

U.S. Pat. No. 2,212,180 to Murphy discloses a method of packaging heavy metal coils for shipment. The shipping arrangement disclosed by Murphy generally includes a sheet wrapping that fully encompasses a metal coil and simple metal bands are used to secure the sheet wrapping to the metal coil and an underlying support structure. Wooden planks are incorporated into the sheet wrapping for coil protection. The underlying support structure is used to lift the wrapped metal coil in conventional fashion.

U.S. Pat. No. 3,154,026 to Klasing, Jr. discloses an articulated tie-down load control bracket which may be operatively associated with a metal coil in an "eye vertical" orientation. The control bracket includes two bracket pairs each comprising a pair of angles, a combined yoke and hook member common to both angles, and a pair of pivot pins attached to the combined yoke and hook member. The bracket pairs are located on opposite sides of the metal coil and are independently secured to a flatbed platform using chains and conventional brackets on the sides of the flatbed platform.

U.S. Pat. No. 3,541,977 to Waldman discloses a pallet for transporting toroidal shaped articles comprising a base plate, a series of tie-downs that pass through the "eye" of the toroidal shaped article and secure the same to the base plate, and lifting cables that attach to the base plate for lifting the secured toroidal shaped article. U.S. Pat. No. 4,008,669 to Sumrell discloses an apparently similar mounting arrangement for mounting a metal coil to a pallet as that found in Waldman but discloses resiliently biased tie-down anchors for securing the metal coil and pallet to a flatbed platform.

U.S. Pat. No. 4,204,479 to Rosa discloses a removable solid cover and containment arrangement for truck bed-mounted metal coils. The cover is rigid and generally semi-cylindrical in shape and is adapted to fit over the metal coil. The cover is further adapted so that after it has been placed over the metal coil a removable core member can be run through one side of the cover and the center of the metal coil and then firmly secured to another side of the cover so that any slippage of the metal coil will be effectively contained.

U.S. Pat. No. 4,786,223 to Crissy et al. discloses a system for immobilizing vehicles having pneumatic tires during shipment utilizing tire chocks on each side of the tire and a flexible web harness passing over the tire upper circumference having ends affixed to the chocks. A winch mounted upon one chock tensions the harness while a quick-release fitting at the other end of the harness attaches to the other chock.

U.S. Pat. No. 5,888,039 to Cooley discloses cargo securing system including several elongated block portions having a plurality of studs extending downwardly therefrom for coupling with through holes in a flatbed trailer. A plurality of pipe attachment portions are also provided with each having a recess extending within a lower surface thereof. The recess is dimensioned for coupling with the block portion. A pipe harness is provided comprising a pair of elongated straps, a pair of short cross straps, and crisscrossing central straps. The short cross straps have free ends with buckles disposed thereon. An extension strap is adapted for coupling with free ends of the elongated straps of the pipe harness. The extension strap has a clip on a free end thereof for engaging existing securement buckles on the trailer. A coupling strap is provided having clips disposed on opposing free ends thereof. The coupling strap couples with the buckles of the short cross straps and the existing securement buckles of the flatbed trailer.

U.S. Pat. No. 7,214,014 to Stanley discloses a cargo restraint system comprising a tie-down assembly of restraining tie-down arms having interconnected common proximal extremities and a plurality of distal extremities. The tie-down assembly is arranged such that an angle is formed between each arm, the vertex of the angle being congruent with the common proximal extremities.

U.S. Pat. No. 7,270,507 to Jernigan discloses a safety coil sling for securing a metal coil on a flatbed trailer having a round or elliptical primary cable attached at one end to a first anchoring chain and at an opposite end to a second anchoring chain, and a plurality of connecting cables for connecting opposite sides of the primary cable across the top of the coil, thereby securing the coil on the trailer. Another disclosed embodiment includes the primary cable being divided into parallel segments at the points of attachment of the connecting cables and the connecting cables are slidably attached to one of the parallel segments to allow the connecting cables to slide within a fixed area, thus providing a mechanism for relieving tension on the sling during weight shifts within the coil occurring during transport.

While numerous load securing device are known in the shipping art as evidenced by the foregoing patents, there is generally a lack of attention to fall prevention issues and further, ease of use, or lack thereof, of such devices in practice. The focus of the prior art in the shipping field is generally on securing the load with little regard given to the safety of the user and labor required to effect installation of the load securing device on an intended load. This disclosure now turns to devices and methods for efficient, labor-saving, and safe load securing operations involving metal coils.

SUMMARY OF THE INVENTION

As described herein, a metal coil securing device and method is disclosed that desirably encompasses components that are familiar to freight shippers and flatbed carriers for the movement of eye vertical, skidded coils. Such components often include nylon strapping and coil edge protection. However, unlike current securement methods described previously, disclosure is provided herein that the metal coil securing device may be used to secure a metal coil to a flatbed transport trailer by a user standing at ground level. In particular, disclosure is provided herein wherein it described that a user standing at ground level may attach the metal coil securing device to the metal coil while the metal coil is present at a loading location, for example, on the ground or on a load dock. Thereafter, with the metal coil securing device associated with metal coil, the combined unit, namely, the metal coil and metal coil securing device, may be loaded in a conventional fashion onto a flatbed transport trailer. Desirably, the metal coil securing device has associated tie down straps that are accessible by a user, for example a driver, standing at ground level relative to the flatbed transport trailer so that the user may finish securing the metal coil to the flatbed transport trailer while standing at ground level typically using existing ratchets on the flatbed transport trailer. As a result, the disclosed metal coil securing device ameliorates at least in part the risks associated with drivers climbing onto a flatbed transport trailer to perform conventional securement and tarping tasks practiced in the prior art. Upon delivery to the consignee, the driver or another person at the delivery location can remove the ratchet portion of the load securement. Then the metal coil and attached securing device is removed from the flatbed transport trailer and placed at ground level or at another location such as a receiving loading dock. However, throughout the unloading process the driver and other personnel are not required to mount the flatbed transport trailer for unloading operations and thereby be at risk of falling from the flatbed trailer. The last step in the delivery process is to remove the metal coil securing device from the metal coil, again at ground level or on the safety of a loading dock.

The desirable use of lightweight yet sturdy materials provides advantages in limiting the labor necessary to secure the metal coil securing device to the metal coil. The metal coil securing device may be designed to accommodate a wide range of metal coil sizes both in width and height and may be configured, if desired, to accommodate metal coils that are not in the eye vertical orientation. Tie downs may be a permanent part of the device and will typically meet Federal Motor Carrier Safety Administration (FMCSA) mandates. Typically, nylon securing straps or tie downs meet such mandates and may be used in the metal coil securing device.

Turning to specific features of the metal coil securing device, the device typically comprises a coil cover adapted to encompass at least a portion of a metal coil and a plurality of tie down straps affixed to the coil cover, with each tie down secured along a portion of its length to the coil cover such that each tie down has two free ends extending outward from the periphery of the coil cover. In one form, the coil cover may comprise a flexible sheet material. As an example, a coil cover may be shaped to encompass an end of the metal coil and the tie down straps may be secured to the coil cover by stitching. In one specific embodiment, the coil cover may comprise nylon tarp material and the tie down straps may comprise nylon straps sewn on the nylon tarp material.

A feature of the metal coil securing device is the provision of optional hook and loop fastener sections secured to an underside of the coil cover adapted to contact the metal coil. Softeners may be secured by the hook and loop fastener sections to the coil cover for protecting the metal coil.

The tie down straps may be secured to the coil cover to intersect at one location on the coil cover. In the example provided previously, the coil cover may comprise a flexible sheet material. The flexible sheet material may have a generally circular shape and the tie down straps may intersect at an approximate center of the coil cover and extend radially outward therefrom.

An attachment device may be associated with the metal coil securing device and be adapted to secure the coil cover to the metal coil. In one form, the attachment device comprises a belting arrangement to secure the coil cover to the metal coil. In the example provided previously, the coil cover may comprise a flexible sheet material and the attachment device, such as a belting arrangement, may be further adapted to conform the flexible sheet material to the shape of the metal coil.

As described generally previously, a method of securing a metal coil to a transport trailer is also disclosed herein and generally comprises providing a metal coil securing device comprising a coil cover and associated tie down straps, associating the coil cover with the metal coil, securing the coil cover to the metal coil, loading the metal coil with the secured coil cover onto the transport trailer and using free ends of the tie down straps to secure the metal coil to the transport trailer. Desirably, the tie down straps are of sufficient length that the free ends thereof are accessible by a user standing at ground level. As described previously, the coil cover may comprise a flexible sheet material. Accordingly, the step of associating the coil cover to the metal coil may comprise at least in part conforming the flexible sheet material to the metal coil. The step of securing the coil cover to the metal coil may involve using a belting system to secure the coil cover to the metal coil. As described previously, another feature of the coil cover may involve the addition of hook and loop fastener sections secured to an underside of the coil cover, and the method may further comprise associating softeners with the hook and loop fastener sections for protecting the metal coil.

Further details and advantages of the metal coil securing device and associated methods of use are described hereinafter in conjunction with the accompanying drawing figures wherein like parts are designated with like reference numerals throughout.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific devices, features, and components illustrated in the accompanying drawing figures and described herein are simply exemplary and should not be considered as limiting.

Figure 1:
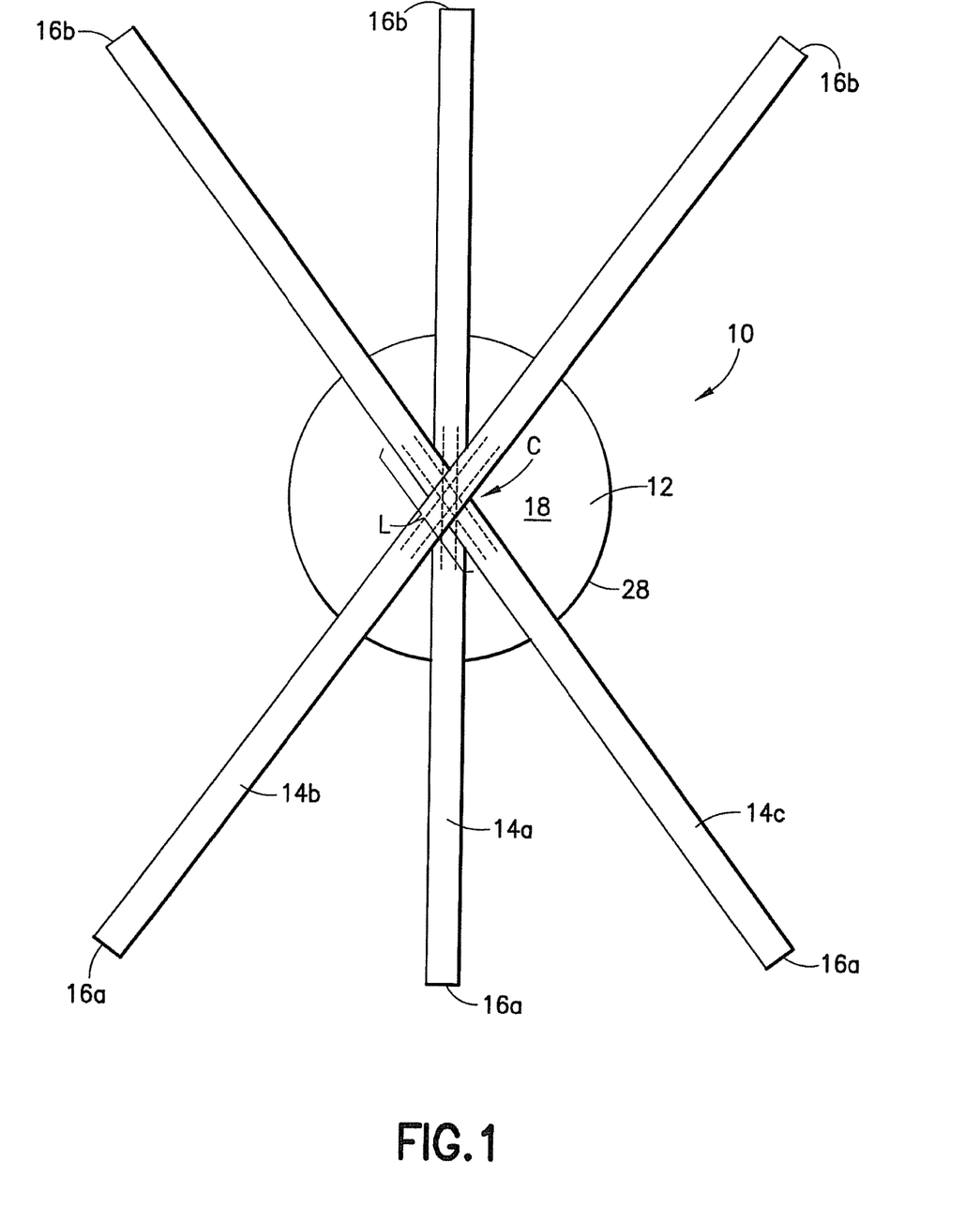
FIG. 1 is a top view of metal coil securing device.
Figure 2:
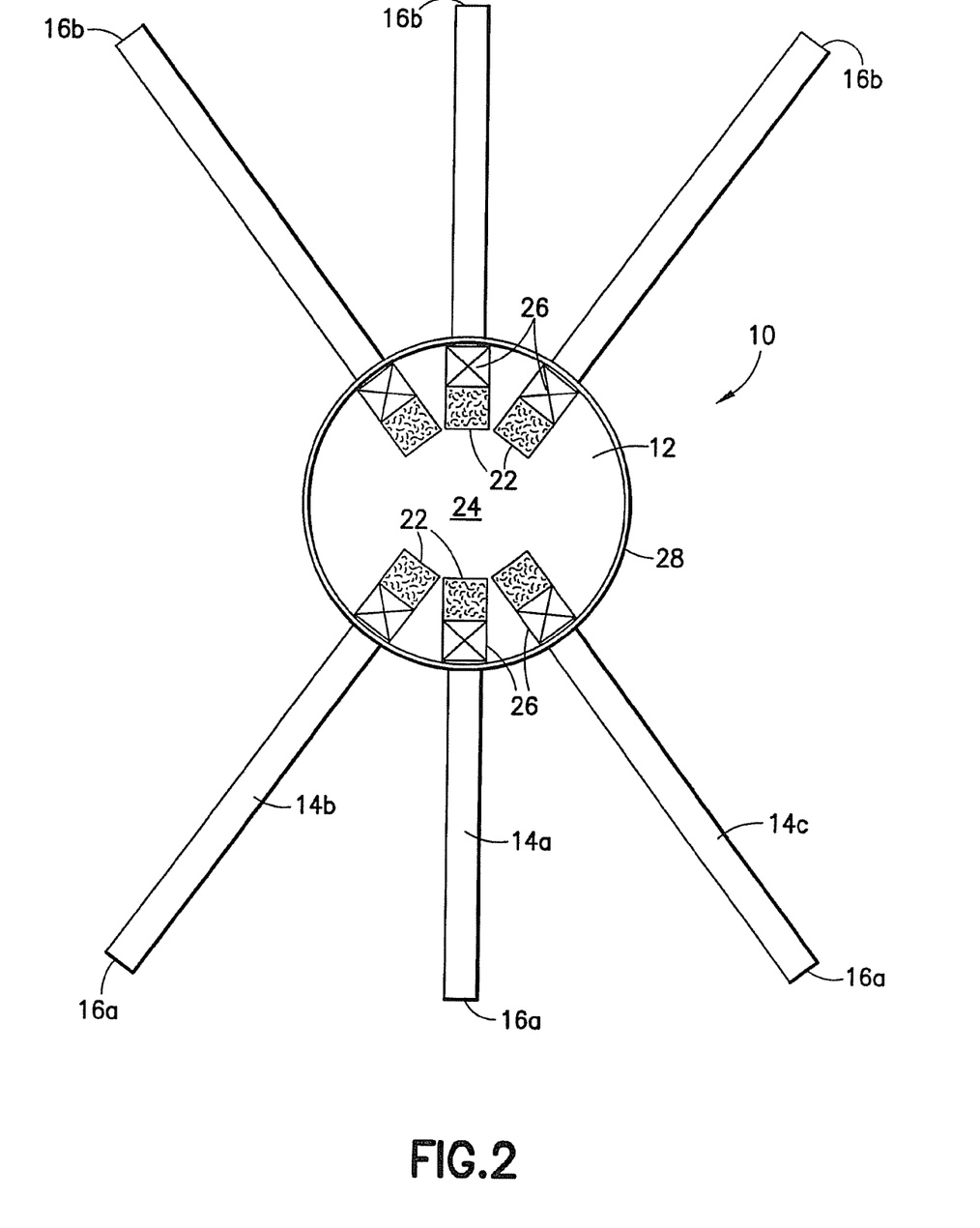
FIG. 2 is a bottom or underside view of the metal coil securing device.
Figure 3:
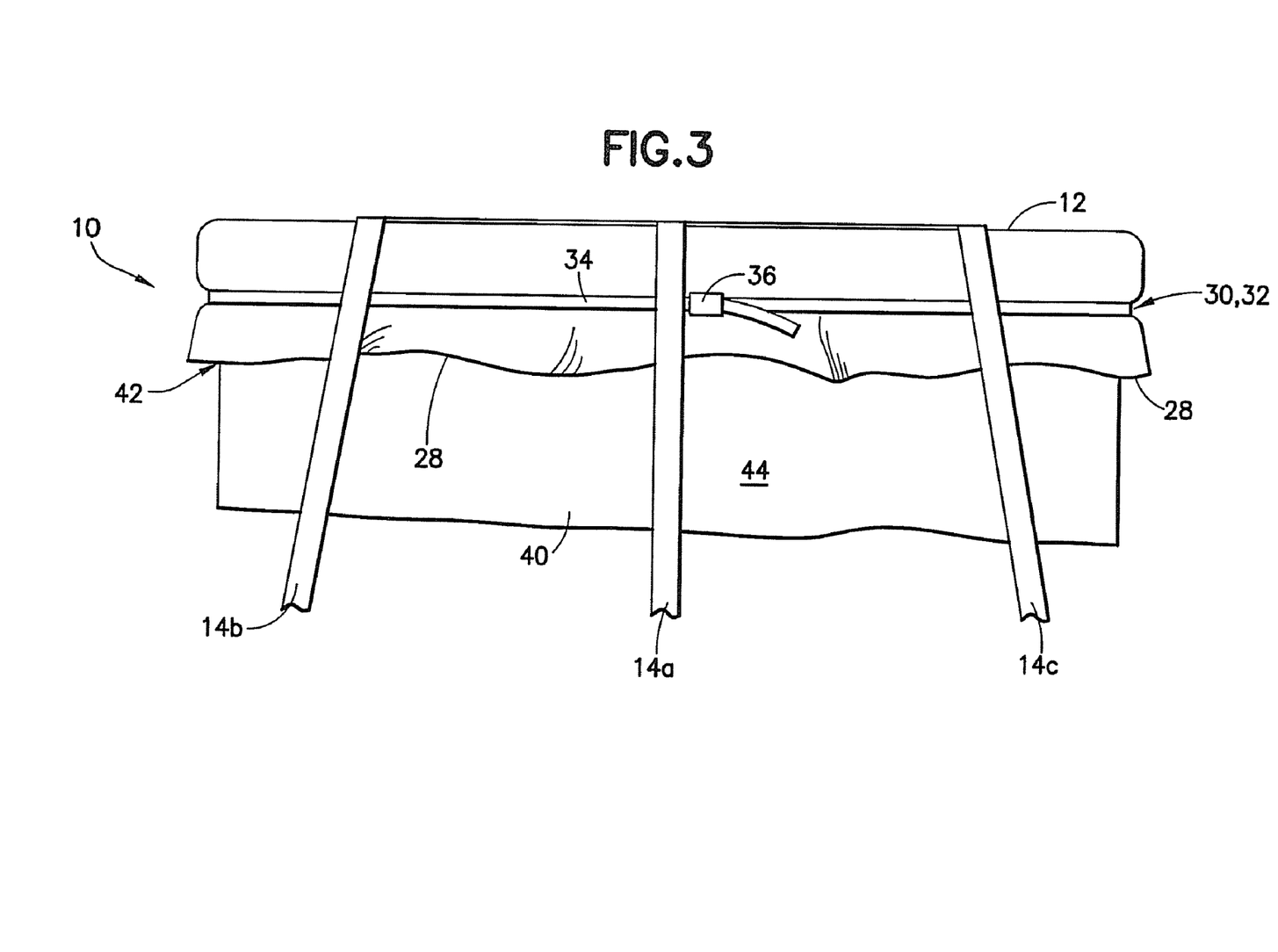
FIG. 3 is a perspective view showing the metal coil securing device associated with a metal coil.
Figure 4:
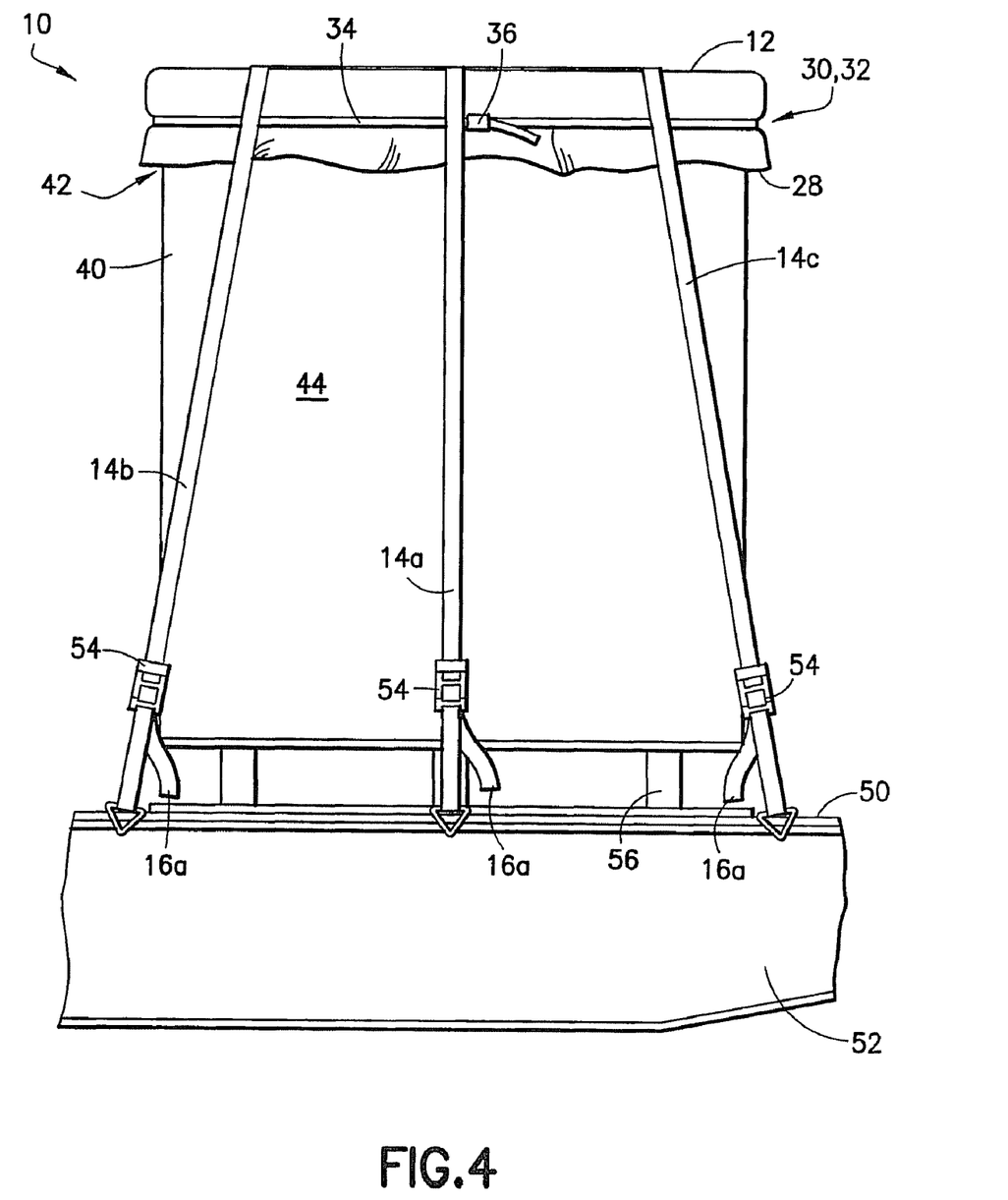
FIG. 4 is a perspective view showing the metal coil securing device associated with the metal coil as in FIG. 3 and further showing the metal coil secured by the securing device to a flatbed transport trailer for transport.
Figure 5:
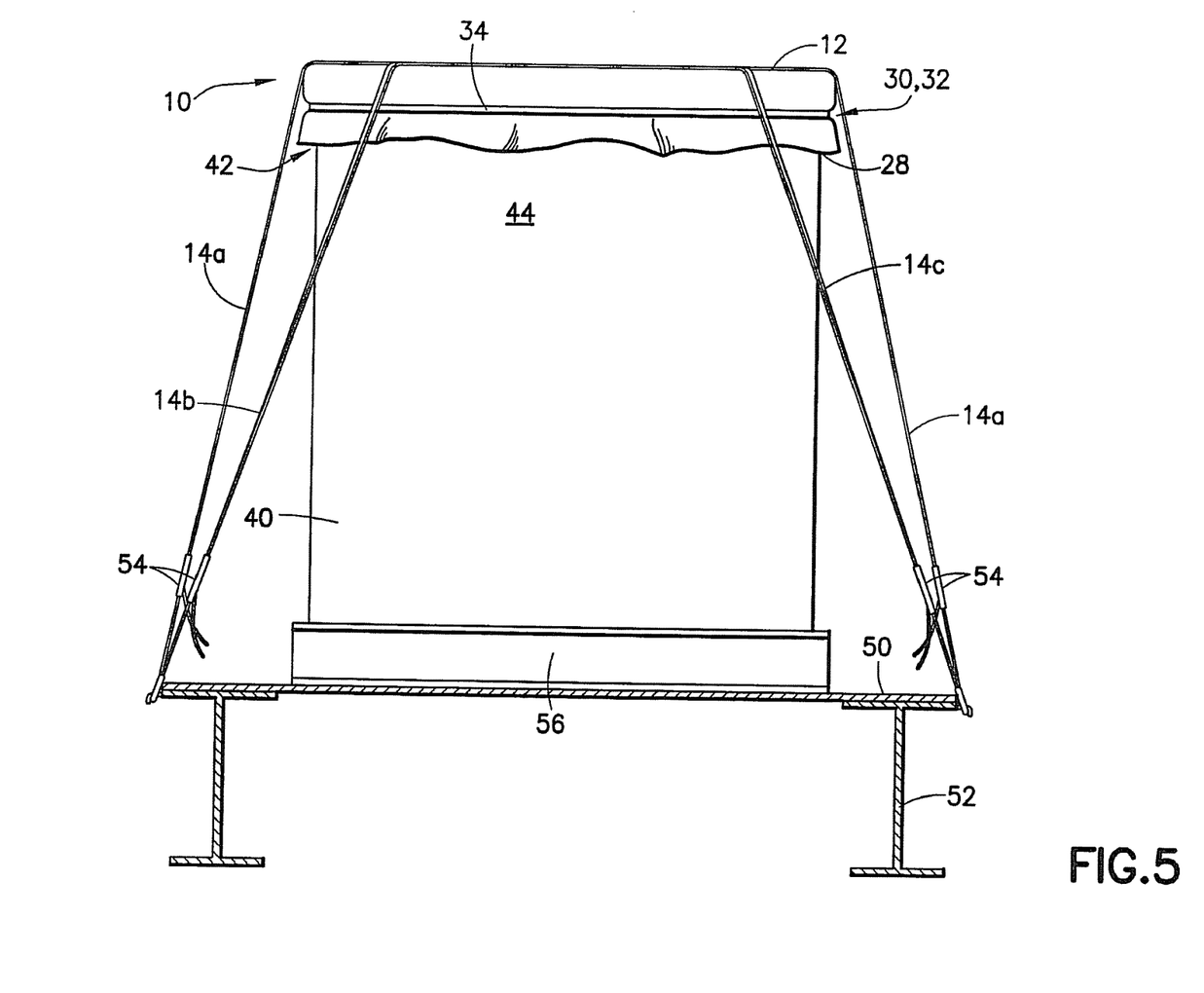
FIG. 5 is another perspective view showing the metal coil secured by the securing device to the flatbed transport trailer for transport.

An embodiment of a metal coil securing device 10 is shown in FIGS. 1-2 and is used to secure a metal coil 40 to a flatbed platform 50 of a transport trailer 52. Securing device 10 typically comprises a coil cover 12 adapted to encompass at least a portion of metal coil 40. In one form, coil cover 12 is generally circular shaped and formed of flexible sheet material such as nylon tarp material. Coil cover 12 in the depicted embodiment is appropriately sized to encompass at least a top end 42 of metal coil 40 when the metal coil 40 is situated in an "eye vertical" orientation. Desirably, coil cover 12 extends downward from top end 42 of metal coil 40 to encompass at least a portion of the outside circumference or surface 44 of the metal coil 40 as depicted in FIGS. 3-5 described herein. However, this particular construction should not be considered as limiting or exhaustive for the configuration of coil cover 12, as the coil cover 12 may shaped and configured to encompass all or a portion of the outer circumference of metal coil 40. In another possibility applicable, for example, if the metal coil 40 is to be loaded onto flatbed platform 50 in an "eye horizontal" orientation, coil cover 12 may be formed to cover all or a portion of the outer circumference of the metal coil 40 and, if desired, all or portions of the two opposing ends of metal coil 40 when oriented in the "eye horizontal" orientation. Such an arrangement is disclosed in U.S. Pat. No. 4,204,479 to Rosa, now incorporated herein by reference. However, in the Rosa patent the coil cover is a rigid structure rather than a flexible member such as coil cover 12. Moreover, it will appreciated by those skilled in the shipping art that all the various aspects of metal coil securing device 10 described herein may be adapted for restraining other loads on flatbed platform 40, such as I-beams as one specific example or even non-symmetrical loads.

A plurality of tie down straps 14 are affixed to the coil cover 12. Each tie down strap 14 is secured along a portion of its length L to coil cover 12 such that each tie down strap 14 has two opposing free ends 16a, 16b extending outward from the periphery of the coil cover 12. Tie down strap 14 are desirable made of flexible but sturdy material, such as nylon, and may be secured to coil cover by stitching. In one specific embodiment of metal coil securing device 10, coil cover 12 comprises nylon tarp material and tie down straps 14 comprise nylon straps sewn onto the nylon tarp material. A typical configuration of tie down straps 14 is shown in FIGS. 1-2, wherein one tie down strap 14a is sewn onto a top side 18 of coil cover 12 to generally bisect the coil cover 12 on a 90° angle in the orientation shown in FIG. 1, and two slightly longer tie down straps 14b, 14c are sewn onto the top side 18 of coil cover 12 at 45° angles relative to the first tie down strap 14a but in opposite directions. Accordingly, all three tie down straps 14a, 14b, 14c intersect at an approximate center area C of coil cover 12 and extend radially outward therefrom. The sewing of the tie down straps 14 to coil cover 12 is only from center area C outward for a fixed distance, for example, 20 inches on all three tie down straps 14.

A feature of the metal coil securing device 10 is the provision of optional hook and loop fastener sections 22 secured to an underside 24 of coil cover 12. Underside 24 of coil cover 12 faces and is adapted to contact metal coil 40. Softeners 26 may be secured by the hook and loop fastener sections 22 to the underside 24 of coil cover 12 for protecting the metal coil 40. Softeners 26 may be any suitable material known in the shipping art such as felt material. Hook and loop fastener sections 22 are typically sewn to the underside 24 of coil cover 12 and typically directly underneath where tie down straps 14 are located. In one exemplary configuration, six hook and loop fastener sections 22 are provided on the underside 24 of coil cover and may have dimensions such as 20 inches long and 6 inches wide. Typically, hook and loop fasteners sections 22 extend inward from an outer peripheral edge 28 of coil cover 12. Softeners 26 are desirably similar in size to hook and loop fastener sections 22 and are adjusted to attach to the hook and loop fastener sections 22 at locations where tie down straps 14 on the outer or top side 18 of coil cover 12 are to come into contact with the outer most edge of the metal coil 40.

An attachment device 30 may be associated with the metal coil securing device 10 and be adapted to secure coil cover 12 to metal coil 40. In one form, attachment device 30 comprises a belting arrangement 32 comprising a belt member 34 and a securing buckle 36 which is used to secure coil cover 12 to metal coil 40. Another feature of belting arrangement 32 is that the belting arrangement 32 gathers excess material and secures coil cover 12 to the metal coil 40. In one implementation, as shown in FIGS. 3-5, belting arrangement 32 is situated approximately several inches from the top end 42 of metal coil 40.

The alignment of tie down straps 14 on coil cover 12 is consistent with the FMCSA required pattern for metal coil securement on a flatbed platform 50 of a transport trailer 52. As noted previously, tie down straps 14 are attached only in the middle area of coil cover 12 desirably so that a multiple of coil sizes can be accommodated without creating a tent effect. The hook and loop fastener sections 22 are sewn to the underside 24 of coil cover 12 to hold softeners 26, such as felt pads in place, and allows for the adjustment of the position of the softeners 26 so that a multiple of coil sizes can be accommodated while ensuring that the softeners 26 line up between tie down straps 14 and the outer most edge of metal coil 40.

Referring further to FIGS. 3-5, a method of using metal coil securing device 10 to secure metal coil 40 to flatbed platform 50 of transport trailer 52 will now be described. In general, it desirable to associated metal coil securing device 10 with metal coil 40 while the metal coil 40 is located at ground level or on a loading dock. In use, coil cover 12 with attached tie down straps 14 is place over top end 42 of metal coil 40 so that the underside 24 of coil cover 12 contact the metal coil 40. Desirably, softeners 26 are in place on the underside 24 of coil cover 12 to contact at least the upper or top end 42 of metal coil 40 to protect the same. Once coil cover 12 is correctly positioned on the top end 42 of metal coil 40, belting arrangement 32 comprising belt member 34 and securing buckle 36 may be used to secure coil cover 12 to metal coil 40. The metal coil 40 with attached or secured coil cover 12 may be loaded onto flatbed platform 50 of transport trailer 52. As shown in FIGS. 4-5, metal coil 40 may rest on a conventional pallet 56 in an "eye vertical" orientation. Pallet 56 may be independently secured to platform 50 if desired. Desirably, the free ends 16 of tie down straps 14 are of sufficient length that the free ends 16 are accessible by a user, such as a truck driver, standing at ground level without having to climb onto the flatbed platform 50. At this point using tie down straps 14, the user can safely secure the metal coil 40 to the flatbed platform 50 while standing at ground level using existing ratchets 54. Upon delivery to the consignee, the user can remove the ratchets 54 to release load securement. Then, metal coil 40 with attached metal coil securing device 10 may be removed as a unit from flatbed platform 50 and placed at ground level. Attachment device 30 is released allowing coil cover 12 to be removed from metal coil 40. All of these delivery steps are again accomplished without an operator having to climb onto flatbed platform and thereby being placed at risk of falling from the flatbed platform 50.

While a metal coil securing device having various inventive features and methods of using the metal coil securing device to secure a metal coil to a flatbed platform were described in the foregoing detailed description, those skilled in the art may make modifications and alterations to metal coil securing device and associated securement methods without departing from the scope and spirit of the invention. Accordingly, the foregoing detailed description is intended to be illustrative rather than restrictive. The invention described hereinabove is defined by the appended claims and all changes to the invention that fall within the meaning and the range of equivalency of the claims are to be embraced within their scope.

The invention claimed is:

1. A metal coil securing device, comprising:
   a coil cover adapted to encompass at least a portion of a metal coil;
   a plurality of tie down straps affixed to the coil cover, with each tie down strap secured along a portion of its length to the coil cover such that each tie down strap has two free ends extending outward from a periphery of the coil cover; and
   one or more removable softeners secured to the coil cover for protecting the metal coil, and wherein the one or more softeners are secured by hook and loop fastener sections to an underside of the coil cover for protecting the metal coil.

2. A metal coil securing device as claimed in claim 1 wherein the coil cover comprises a flexible sheet material.

3. A metal coil securing device as claimed in claim 1 wherein the coil cover is shaped to encompass an end of the metal coil.

4. A metal coil securing device, comprising:
   a coil cover adapted to encompass at least a portion of a metal coil;
   a plurality of tie down straps affixed to the coil cover, with each tie down strap secured along a portion of its length to the coil cover such that each tie down strap has two free ends extending outward from a periphery of the coil cover; and
   one or more removable softeners secured to the coil cover for protecting the metal coil; and
   wherein the tie down straps are secured to the coil cover to intersect at one location on the coil cover.

5. A metal coil securing device as claimed in claim 4 wherein the coil cover comprises a flexible sheet material having a generally circular shape and the tie down straps intersect at an approximate center of the coil cover and extend radially outward therefrom.

6. A metal coil securing device as claimed in claim 1 further comprising an attachment device adapted to secure the coil cover to the metal coil.

7. A metal coil securing device as claimed in claim 6 wherein the attachment device comprises a belting arrangement to secure the coil cover to the metal coil.

8. A metal coil securing device as claimed in claim 6 wherein the coil cover comprises flexible sheet material and the attachment device comprises a belting arrangement further adapted to conform the flexible sheet material to the shape of the metal coil.

9. A metal coil securing device as claimed in claim 1 wherein the coil cover comprises nylon tarp material and the tie down straps comprise nylon straps sewn to the nylon tarp material.

10. A method of securing a metal coil to a transport trailer, comprising:
    providing a metal coil securing device, comprising:
      a coil cover adapted to encompass at least a portion of the metal coil;
      a plurality of tie down straps affixed to the coil cover, with each tie down strap secured along a portion of its length to the coil cover such that each tie down strap has two free ends extending outward from a periphery of the coil cover; and
      one or more removable softeners secured to the coil cover for protecting the metal coil;
    associating the coil cover with the metal coil;
    securing the coil cover to the metal coil;
    loading the metal coil with the secured coil cover onto the transport trailer; and
    using the free ends of the tie down straps to secure the metal coil to the transport trailer.

11. A method of securing a metal coil to a transport trailer as claimed in claim 10 wherein the tie down straps are of sufficient length that the free ends thereof are accessible by a user standing at ground level such that the user may secure the metal coil to the transport trailer while standing at ground level.

12. A method of securing a metal coil to a transport trailer as claimed in claim 10 wherein the coil cover comprises a flexible sheet material such that the step of associating the coil cover with the metal coil comprises at least in part conforming the flexible sheet material to the metal coil.

13. A method of securing a metal coil to a transport trailer as claimed in claim 10 wherein the step of securing the coil cover to the metal coil comprises using a belting arrangement to secure the coil cover to the metal coil.

14. A method of securing a metal coil to a transport trailer as claimed in claim 10 wherein the coil cover further comprises hook and loop fastener sections secured to an underside of the coil cover, and the method further comprises associating the one or more with the hook and loop fastener sections for protecting the metal coil.

15. A metal coil securing device as claimed in claim 2 wherein the tie down straps are secured to the coil cover by stitching.

16. A metal coil securing device as claimed in claim 1 wherein the tie down straps are of sufficient length that the free ends thereof are accessible by a user standing at ground level such that the user may secure the metal coil to a transport trailer while standing at ground level.

* * * * *

UNITED STATES PATENT AND TRADEMARK OFFICE
CERTIFICATE OF CORRECTION

| | | |
|---|---|---|
| PATENT NO. | : 8,025,468 B2 | Page 1 of 1 |
| APPLICATION NO. | : 12/060451 | |
| DATED | : September 27, 2011 | |
| INVENTOR(S) | : Paul Sever | |

It is certified that error appears in the above-identified patent and that said Letters Patent is hereby corrected as shown below:

Column 8, Claim 14, Line 45, after "more" insert -- softeners --

Signed and Sealed this
Third Day of January, 2012

David J. Kappos
*Director of the United States Patent and Trademark Office*